US011965751B2

(12) United States Patent
Lee

(10) Patent No.: US 11,965,751 B2
(45) Date of Patent: Apr. 23, 2024

(54) VEHICULAR ELECTRONIC DEVICE, OPERATION METHOD OF VEHICULAR ELECTRONIC DEVICE, AND SYSTEM

(71) Applicant: LG Electronics Inc., Seoul (KR)

(72) Inventor: Jinsang Lee, Seoul (KR)

(73) Assignee: LG Electronics Inc., Seoul (KR)

( * ) Notice: Subject to any disclaimer, the term of this patent is extended or adjusted under 35 U.S.C. 154(b) by 288 days.

(21) Appl. No.: 17/260,121

(22) PCT Filed: Nov. 1, 2018

(86) PCT No.: PCT/KR2018/013210
§ 371 (c)(1),
(2) Date: Jan. 13, 2021

(87) PCT Pub. No.: WO2020/091114
PCT Pub. Date: May 7, 2020

(65) Prior Publication Data
US 2021/0325205 A1  Oct. 21, 2021

(51) Int. Cl.
*G01C 21/36* (2006.01)
*H04L 67/12* (2022.01)

(52) U.S. Cl.
CPC ......... *G01C 21/3691* (2013.01); *H04L 67/12* (2013.01)

(58) Field of Classification Search
CPC . G01C 21/3691; G01C 21/3889; H04L 67/12; H04W 4/44; H04W 4/024; H04W 4/40; B60R 16/03; B60W 30/14; B60W 40/02; B60W 40/10; G05D 1/00; G05D 1/02
See application file for complete search history.

(56) References Cited

U.S. PATENT DOCUMENTS

2018/0188743 A1* 7/2018 Wheeler .............. G05D 1/0276

FOREIGN PATENT DOCUMENTS

| JP | 2009036711 | | 2/2009 |
|---|---|---|---|
| KR | 2007030004 A | * | 3/2007 |
| KR | 20070030004 | | 3/2007 |
| KR | 101200680 | | 11/2012 |
| KR | 20150082429 | | 7/2015 |

OTHER PUBLICATIONS

KR 20070030004A—English Translation (Year: 2007).*
International Search Report in International Appln. No. PCT/KR2018/013210, dated Aug. 1, 2019, 5 pages (with English translation).

* cited by examiner

*Primary Examiner* — Ian Jen
*Assistant Examiner* — Renee LaRose
(74) *Attorney, Agent, or Firm* — Fish & Richardson P.C.

(57) ABSTRACT

The present disclosure relates to a vehicular electronic device including a power supply configured to supply power, a memory, an interface configured to receive HD map data on a specific area from a server through a communication device and to receive a turn-off signal and a turn-on signal, and at least one processor configured to store first electronic horizon data on an area around a vehicle, generated based on HD map data, in the memory upon receiving the turn-off signal.

11 Claims, 21 Drawing Sheets

VEHICULAR ELECTRONIC DEVICE, OPERATION METHOD OF VEHICULAR ELECTRONIC DEVICE, AND SYSTEM

CROSS-REFERENCE TO RELATED APPLICATIONS

This application is a National Stage application under 35 U.S.C. § 371 of International Application No. PCT/KR2018/013210, filed on Nov. 1, 2018. The disclosure of the prior application is incorporated by reference in its entirety.

TECHNICAL FIELD

The present disclosure relates to a vehicular electronic device, an operation method of the vehicular electronic device, and a system.

BACKGROUND ART

A vehicle is an apparatus that moves in a direction desired by a user riding therein. A representative example of a vehicle is an automobile. In the automobile industry field, for convenience of a user driving a vehicle, research on an advanced driver assistance system (ADAS) application is actively underway. Further, research on an autonomous driving application for a vehicle is actively being conducted.

The ADAS application or the autonomous driving application may be constituted based on map data. According to the conventional art, small-sized standard-definition (SD) map data is provided to a user in the state of being stored in a memory provided in a vehicle. However, with the recent demand for voluminous high-definition (HD) map data, a cloud service is utilized for provision of map data.

Recently, research on technology for generating electronic horizon data based on an HD map has been actively conducted. An electronic device provided in a vehicle continuously receives an HD map of a specific area while the vehicle is traveling, and generates electronic horizon data based on the received HD map. However, when a vehicle is turned on, it takes time to receive an HD map and to generate electronic horizon data, and thus there is a delay until the vehicle is capable of traveling based on the electronic horizon data.

DISCLOSURE

Technical Problem

The present disclosure has been made in view of the above problems, and it is an object of the present disclosure to provide a vehicular electronic device that determines a time at which to generate electronic horizon data and a time at which to provide the generated electronic horizon data depending on whether a vehicle is turned on or off.

In addition, it is an object of the present disclosure to provide an operation method of a vehicular electronic device that determines a time at which to generate electronic horizon data and a time at which to provide the generated electronic horizon data depending on whether a vehicle is turned on or off.

In addition, it is an object of the present disclosure to provide a system that determines a time at which to generate electronic horizon data and a time at which to provide the generated electronic horizon data depending on whether a vehicle is turned on or off.

The objects to be accomplished by the disclosure are not limited to the above-mentioned objects, and other objects not mentioned herein will be clearly understood by those skilled in the art from the following description.

Technical Solution

In order to accomplish the above objects, a vehicular electronic device according to an embodiment of the present disclosure includes a power supply configured to supply power, a memory, an interface configured to receive HD map data on a specific area from a server through a communication device and to receive a turn-off signal and a turn-on signal, and at least one processor configured to store first electronic horizon data on an area around a vehicle, generated based on HD map data, in the memory upon receiving the turn-off signal.

According to an embodiment of the present disclosure, upon receiving the turn-on signal, the processor retrieves the first electronic horizon data stored in the memory and provides the first electronic horizon data before receiving HD map data through the communication device.

According to an embodiment of the present disclosure, upon receiving the turn-on signal, the processor reflects dynamic data obtained after turning on to the retrieved first electronic horizon data and provides the first electronic horizon data.

According to an embodiment of the present disclosure, after receiving the turn-on signal, the processor receives HD map data and updates the first electronic horizon data.

According to an embodiment of the present disclosure, the processor obtains at least one of information about a straight traveling situation of the vehicle or information about a stopped situation of the vehicle, and updates the first electronic horizon data in at least one of the straight traveling situation of the vehicle or the stopped situation of the vehicle.

According to an embodiment of the present disclosure, the processor includes a first processor configured to process the first electronic horizon data and a second processor configured to receive HD map data and to generate second electronic horizon data after receiving the turn-on signal.

Details of other embodiments are included in the detailed description and the accompanying drawings.

Advantageous Effects

According to the present disclosure, there are one or more effects as follows.

First, since it is possible to use electronic horizon data immediately after turning on, there is an effect in that a vehicle is capable of traveling without a delay after being turned on.

Second, since dynamic data obtained after turning on is used, there is an effect of securing the latest information at the time of traveling of a vehicle.

Third, since electronic horizon data is updated in a straight traveling situation or a stopped situation, there is an effect of obtaining the latest electronic horizon data while maintaining traveling stability.

The effects achievable through the disclosure are not limited to the above-mentioned effects, and other effects not mentioned herein will be clearly understood by those skilled in the art from the appended claims.

BEST MODE

Figure 1:
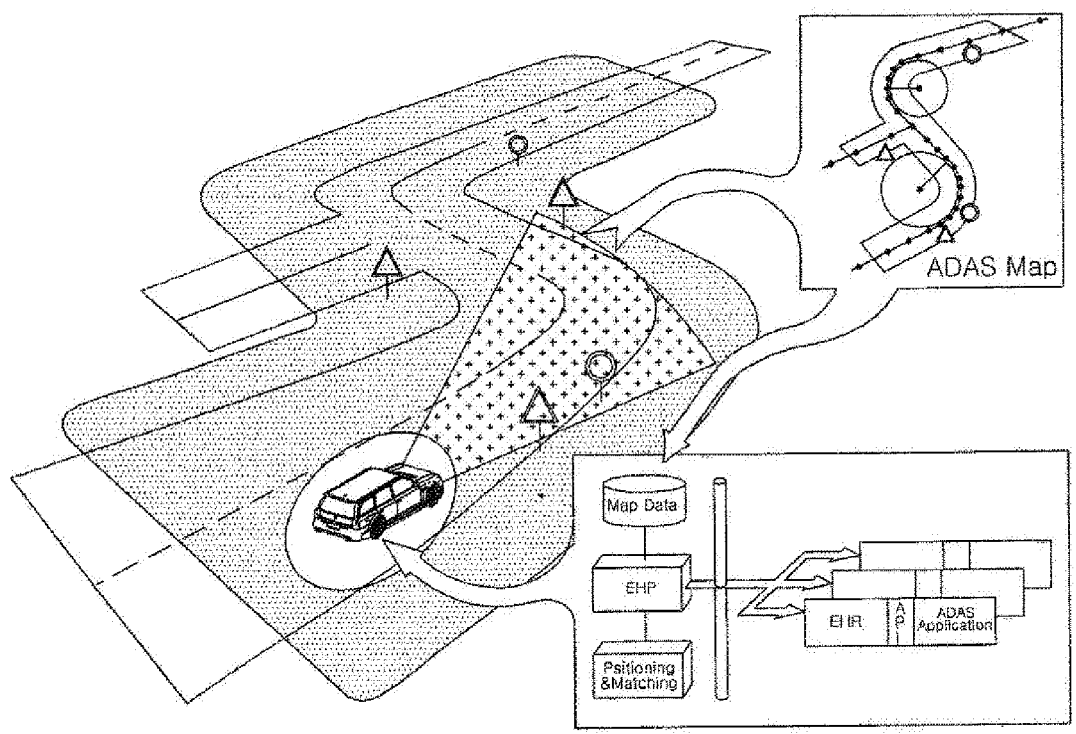
FIG. 1 is a diagram illustrating a vehicle traveling on a road according to an embodiment of the present disclosure.

Hereinafter, embodiments of the present disclosure will be described in detail with reference to the attached drawings. Like reference numerals denote the same or similar components throughout the drawings, and a redundant description of the same components will be avoided. The terms "module" and "unit", with which the names of components are suffixed, are assigned or used only in consideration of preparation of the specification, and may be interchanged with each other. The terms do not have any distinguishable meanings or roles. A detailed description of a related known technology will be omitted where it is determined that the same would obscure the subject matter of embodiments of the present disclosure. Further, the attached drawings are provided to help easy understanding of embodiments of the present disclosure, rather than to limit the scope and spirit of the present disclosure. Thus, it is to be understood that the present disclosure covers all modifications, equivalents, and alternatives falling within the scope and spirit of the present disclosure.

While ordinal numbers including "first", "second", etc. may be used to describe various components, they are not intended to limit the components. These expressions are used only to distinguish one component from another component.

When it is said that a component is "connected to" or "coupled to" another component, it should be understood that the one component may be connected or coupled to the other component directly or through some other component therebetween. On the other hand, when it is said that a component is "directly connected to" or "directly coupled to" another component, it should be understood that there is no other component between the components.

Singular forms include plural referents unless the context clearly dictates otherwise.

In the following description, the term "include" or "have" signifies the presence of a specific feature, number, step, operation, component, part, or combination thereof, but without excluding the presence or addition of one or more other features, numbers, steps, operations, components, parts, or combinations thereof.

In the following description, the left of a vehicle means the left when oriented in the forward traveling direction of the vehicle, and the right of a vehicle means the right when oriented in the forward traveling direction of the vehicle.

FIG. 1 is a diagram illustrating a vehicle traveling on a road according to an embodiment of the present disclosure.

Referring to FIG. 1, a vehicle 10 according to an embodiment of the present disclosure is defined as a transportation device that travels on a road or a railroad. The vehicle 10 conceptually includes an automobile, a train, and a motorcycle. Hereinafter, an autonomous vehicle, which travels without driving manipulation on the part of a driver, or a vehicle equipped with an advanced driver assistance system (ADAS) will be described as an example of the vehicle 10.

The vehicle described in the specification may conceptually include an internal combustion vehicle equipped with an engine as a power source, a hybrid vehicle equipped with an engine and an electric motor as power sources, and an electric vehicle equipped with an electric motor as a power source.

The vehicle 10 may include an electronic device 100. The electronic device 100 may be referred to as an electronic horizon provider (EHP). The electronic device 100 may be mounted in the vehicle 10, and may be electrically connected to other electronic devices provided in the vehicle 10.

Figure 2:
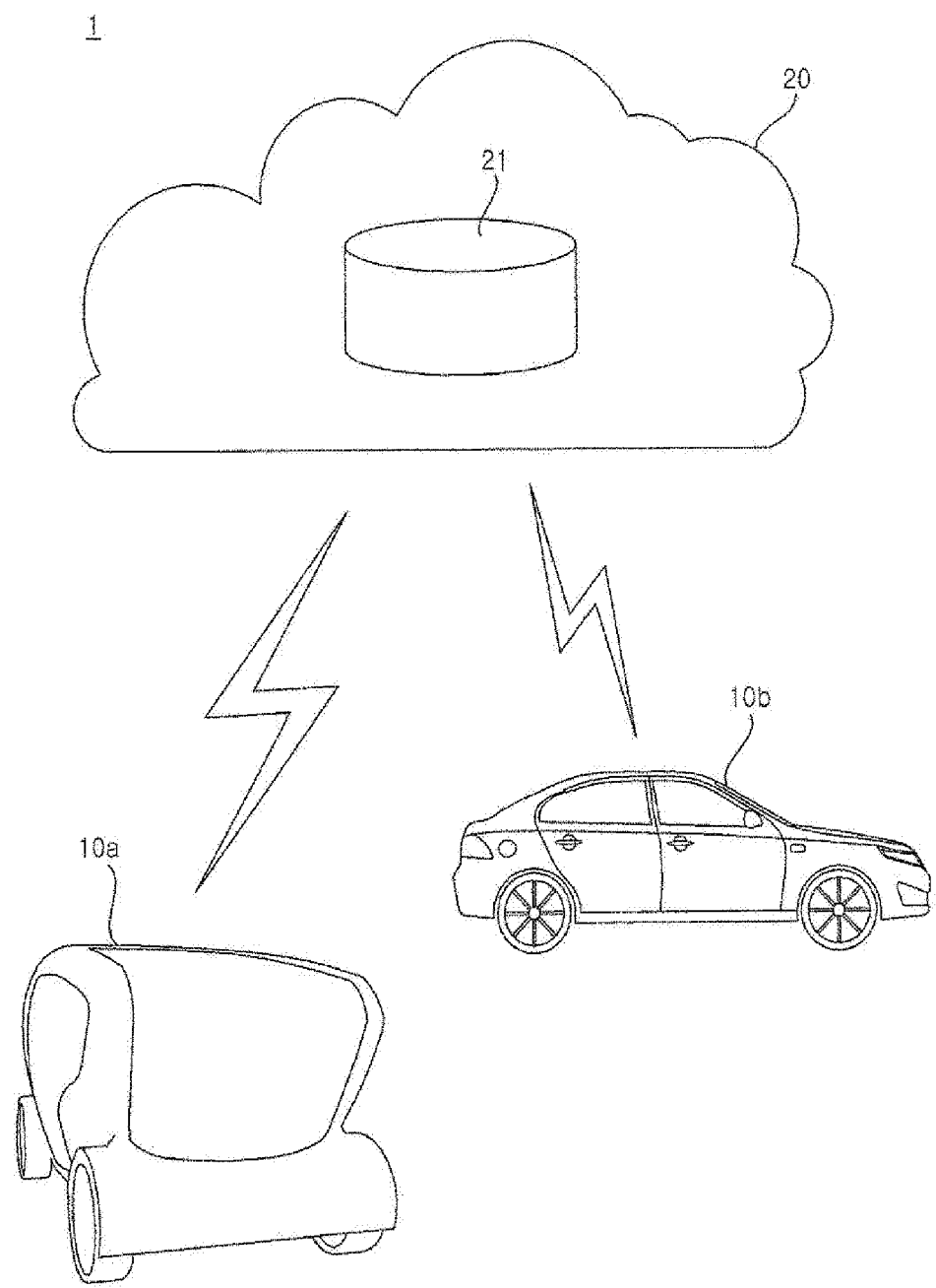
FIG. 2 is a diagram illustrating a system according to an embodiment of the present disclosure.

FIG. 2 is a diagram illustrating a system according to an embodiment of the present disclosure.

Referring to FIG. 2, the system 1 may include an infrastructure 20 and at least one vehicle 10a and 10b.

The infrastructure 20 may include at least one server 21. The server 21 may receive data generated by the vehicles 10a and 10b. The server 21 may process the received data. The server 21 may manage the received data.

The server 21 may receive data generated by at least one electronic device mounted in the vehicles 10a and 10b. For example, the server 21 may receive data generated by at least one of an EHP, a user interface device, an object detection device, a communication device, a driving operation device, a main ECU, a vehicle-driving device, a driving system, a sensing unit, or a location-data-generating device. The server 21 may generate big data based on data received from a plurality of vehicles. For example, the server 21 may receive dynamic data from the vehicles 10a and 10b, and may generate big data based on the received dynamic data. The server 21 may update HD map data based on data received from a plurality of vehicles. For example, the server 21 may receive data generated by the object detection device from the EHP included in the vehicles 10a and 10b, and may update HD map data.

The server 21 may provide pre-stored data to the vehicles 10a and 10b. For example, the server 21 may provide at least one of high-definition (HD) map data or standard-definition (SD) map data to the vehicles 10a and 10b. The server 21 may classify the map data on a per-section basis, and may provide only map data on the section requested from the vehicles 10a and 10b. The HD map data may be referred to as high-precision map data.

The server 21 may provide data processed or managed by the server 21 to the vehicles 10a and 10b. The vehicles 10a and 10b may generate a driving control signal based on the data received from the server 21. For example, the server 21 may provide HD map data to the vehicles 10a and 10b. For example, the server 21 may provide dynamic data to the vehicles 10a and 10b.

Figure 3:
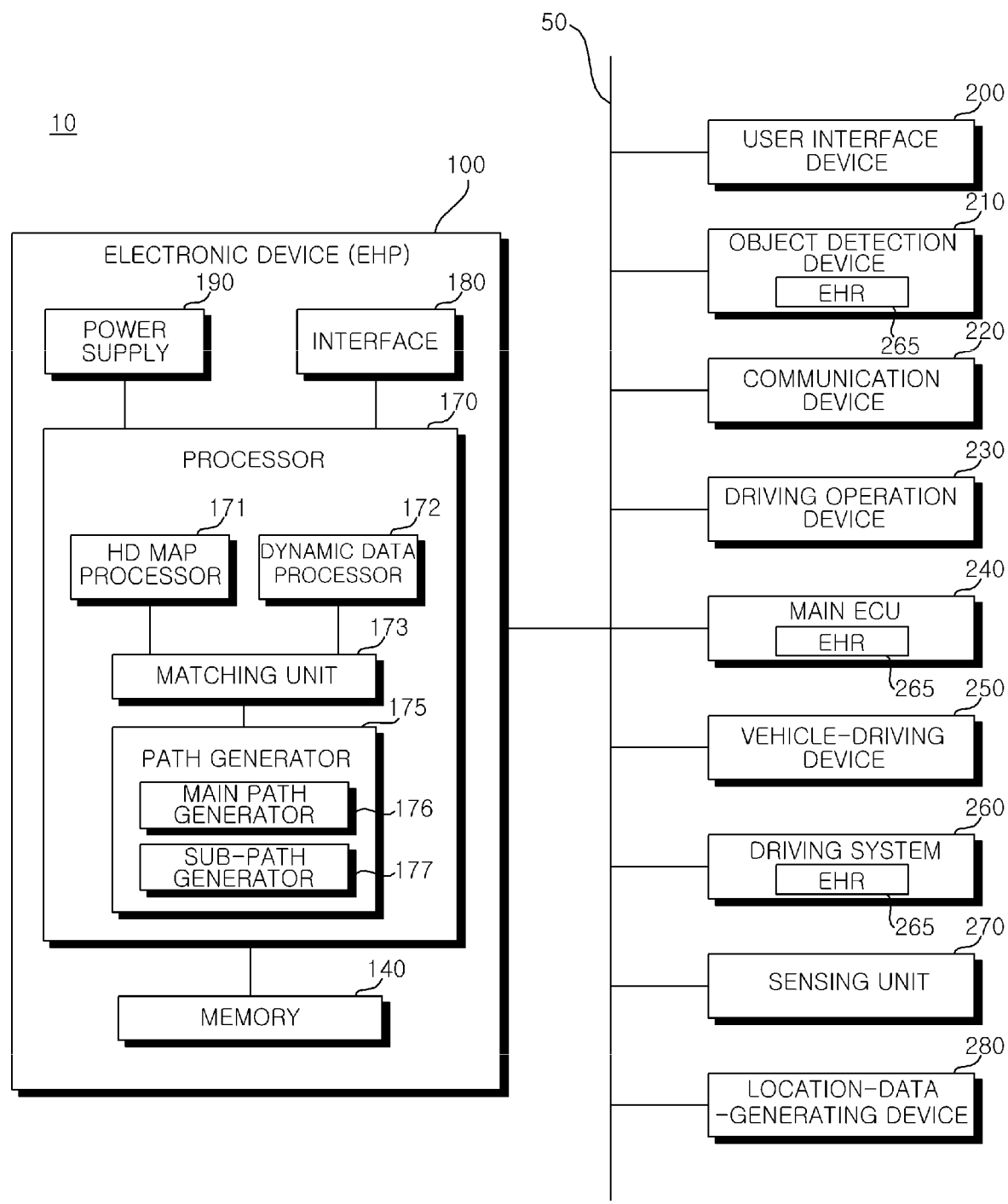
FIG. 3 is a diagram illustrating a vehicle including an electronic device according to an embodiment of the present disclosure.

FIG. 3 is a diagram illustrating a vehicle including an electronic device according to an embodiment of the present disclosure.

Figure 4:
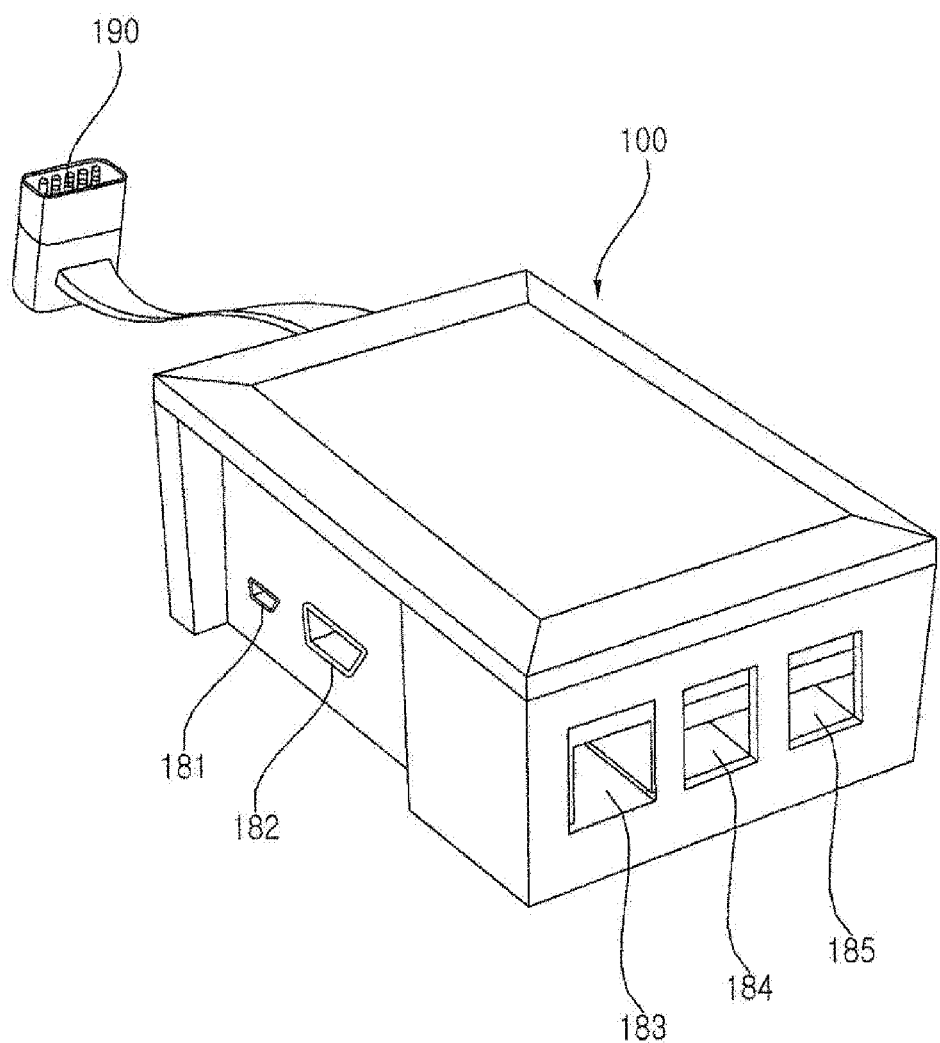
FIG. 4 illustrates the external appearance of an electronic device according to an embodiment of the present disclosure.

FIG. 4 illustrates the external appearance of an electronic device according to an embodiment of the present disclosure.

Referring to FIGS. 3 and 4, the vehicle 10 may include an electronic device 100, a user interface device 200, an object detection device 210, a communication device 220, a driving operation device 230, a main ECU 240, a vehicle-driving device 250, a driving system 260, a sensing unit 270, and a location-data-generating device 280.

The electronic device 100 may be referred to as an electronic horizon provider (EHP). The electronic device 100 may generate electronic horizon data, and may provide the electronic horizon data to at least one electronic device provided in the vehicle 10.

The electronic horizon data may be explained as driving plan data that is used when the driving system 260 generates a driving control signal of the vehicle 10. For example, the electronic horizon data may be understood as driving plan data within a range from a point at which the vehicle 10 is located to a horizon. Here, the horizon may be understood as a point a predetermined distance from the point at which the vehicle 10 is located along a predetermined traveling route. The horizon may refer to a point that the vehicle 10 reaches along a predetermined traveling route after a predetermined time period from the point at which the vehicle 10 is located. Here, the traveling route may refer to a traveling route to a final destination, and may be set through user input.

The electronic horizon data may include horizon map data and horizon path data.

The horizon map data may include at least one of topology data, ADAS data, HD map data, or dynamic data. According to an embodiment, the horizon map data may include a plurality of layers. For example, the horizon map data may include a first layer that matches the topology data, a second layer that matches the ADAS data, a third layer that matches the HD map data, and a fourth layer that matches the dynamic data. The horizon map data may further include static object data.

The topology data may be explained as a map created by connecting the centers of roads. The topology data may be suitable for schematic display of the location of a vehicle, and may primarily have a data form used for navigation for drivers. The topology data may be understood as data about road information, other than information on driveways. The topology data may be generated on the basis of data received by the infrastructure 20. The topology data may be based on data generated by the infrastructure 20. The topology data may be based on data stored in at least one memory provided in the vehicle 10.

The ADAS data may be data related to road information. The ADAS data may include at least one of road slope data, road curvature data, or road speed-limit data. The ADAS data may further include no-passing-zone data. The ADAS data may be based on data generated by the infrastructure 20. The ADAS data may be based on data generated by the object detection device 210. The ADAS data may be referred to as road information data.

The HD map data may include topology information in units of detailed lanes of roads, information on connections between respective lanes, and feature information for vehicle localization (e.g. traffic signs, lane marking/attributes, road furniture, etc.). The HD map data may be based on data generated by the infrastructure 20.

The dynamic data may include various types of dynamic information that can be generated on roads. For example, the dynamic data may include construction information, variable-speed road information, road condition information, traffic information, moving object information, etc. The dynamic data may be based on data received by the infrastructure 20. The dynamic data may be based on data generated by the object detection device 210.

The electronic device 100 may provide map data within a range from the point at which the vehicle 10 is located to the horizon.

The horizon path data may be explained as a trajectory that the vehicle 10 can take within a range from the point at which the vehicle 10 is located to the horizon. The horizon path data may include data indicating the relative probability of selecting one road at a decision point (e.g. a fork, a junction, an intersection, etc.). The relative probability may be calculated on the basis of the time taken to arrive at a final destination. For example, if the time taken to arrive at a final destination is shorter when a first road is selected at a decision point than that when a second road is selected, the probability of selecting the first road may be calculated to be higher than the probability of selecting the second road.

The horizon path data may include a main path and a sub-path. The main path may be understood as a trajectory obtained by connecting roads having a high relative probability of being selected. The sub-path may branch from at least one decision point on the main path. The sub-path may be understood as a trajectory obtained by connecting at least one road having a low relative probability of being selected at at least one decision point on the main path.

The electronic device 100 may include an interface 180, a power supply 190, a memory 140, and a processor 170.

The interface 180 may exchange signals with at least one electronic device provided in the vehicle 10 in a wired or wireless manner. The interface 180 may exchange signals with at least one of the user interface device 200, the object detection device 210, the communication device 220, the driving operation device 230, the main ECU 240, the vehicle-driving device 250, the driving system 260, the sensing unit 270, or the location-data-generating device 280 in a wired or wireless manner. The interface 180 may be configured as at least one of a communication module, a terminal, a pin, a cable, a port, a circuit, an element, or a device.

The power supply 190 may provide power to the electronic device 100. The power supply 190 may receive power from a power source (e.g. a battery) included in the vehicle 10, and may supply the power to each unit of the electronic device 100. The power supply 190 may be operated in response to a control signal provided from the main ECU 240. The power supply 190 may be implemented as a switched-mode power supply (SMPS).

The memory 140 is electrically connected to the processor 170. The memory 140 may store basic data on units, control data for operation control of units, and input/output data. The memory 140 may store data processed by the processor 170. Hardware-wise, the memory 140 may be configured as at least one of ROM, RAM, EPROM, a flash drive, or a hard drive. The memory 140 may store various types of data for the overall operation of the electronic device 100, such as a program for processing or control of the processor 170. The memory 140 may be integrated with the processor 170.

The processor 170 may be electrically connected to the interface 180 and the power supply 190, and may exchange signals therewith. The processor 170 may be implemented using at least one of application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, or electrical units for executing other functions.

The processor 170 may be driven by power provided from the power supply 190. The processor 170 may continuously generate electronic horizon data while receiving power from the power supply 190.

The processor 170 may generate electronic horizon data. The processor 170 may generate electronic horizon data. The processor 170 may generate horizon path data.

The processor 170 may generate electronic horizon data in consideration of the driving situation of the vehicle 10. For example, the processor 170 may generate electronic horizon data on the basis of the driving direction data and the driving speed data of the vehicle 10.

The processor 170 may combine the generated electronic horizon data with the previously generated electronic horizon data. For example, the processor 170 may positionally connect horizon map data generated at a first time point to horizon map data generated at a second time point. For example, the processor 170 may positionally connect horizon path data generated at a first time point to horizon path data generated at a second time point.

The processor 170 may provide electronic horizon data. The processor 170 may provide electronic horizon data to at least one of the driving system 260 or the main ECU 240 through the interface 180.

The processor 170 may include a memory 140, an HD map processor 171, a dynamic data processor 172, a matching unit 173, and a path generator 175.

The HD map processor 171 may receive HD map data from the server 21 through the communication device 220. The HD map processor 171 may store HD map data. According to an embodiment, the HD map processor 171 may process and manage HD map data.

The dynamic data processor 172 may receive dynamic data from the object detection device 210. The dynamic data processor 172 may receive dynamic data from the server 21. The dynamic data processor 172 may store dynamic data. According to an embodiment, the dynamic data processor 172 may process and manage dynamic data.

The matching unit 173 may receive an HD map from the HD map processor 171. The matching unit 173 may receive dynamic data from the dynamic data processor 172. The matching unit 173 may match HD map data and dynamic data to generate horizon map data.

According to an embodiment, the matching unit 173 may receive topology data. The matching unit 173 may receive ADAS data. The matching unit 173 may match topology data, ADAS data, HD map data, and dynamic data to generate horizon map data.

The path generator 175 may generate horizon path data. The path generator 175 may include a main path generator 176 and a sub-path generator 177. The main path generator 176 may generate main path data. The sub-path generator 177 may generate sub-path data.

The electronic device 100 may include at least one printed circuit board (PCB). The interface 180, the power supply 190, and the processor 170 may be electrically connected to the printed circuit board.

Meanwhile, according to an embodiment, the electronic device 100 may be integrally formed with the communication device 220. In this case, the communication device 220 may be included as a lower-level component of the electronic device 100.

The user interface device 200 is a device used to allow the vehicle 10 to communicate with a user. The user interface device 200 may receive user input, and may provide information generated by the vehicle 10 to the user. The vehicle 10 may implement User Interfaces (UIs) or a User Experience (UX) through the user interface device 200.

The object detection device 210 may detect objects outside the vehicle 10. The object detection device 210 may include at least one of a camera, a radar, a lidar, an ultrasonic sensor, or an infrared sensor. The object detection device 210 may provide data on an object, generated on the basis of a sensing signal generated by the sensor, to at least one electronic device included in the vehicle.

The object detection device 210 may generate dynamic data on the basis of a sensing signal with respect to an object. The object detection device 210 may provide the dynamic data to the electronic device 100.

The object detection device 210 may receive electronic horizon data. The object detection device 210 may include an electronic horizon re-constructor (EHR) 265. The EHR 265 may convert the electronic horizon data into a data format that can be used in the object detection device 210.

The communication device 220 may exchange signals with a device located outside the vehicle 10. The communication device 220 may exchange signals with at least one of an infrastructure (e.g. a server) or another vehicle. In order to implement communication, the communication device 220 may include at least one of a transmission antenna, a reception antenna, a Radio-Frequency (RF) circuit capable of implementing various communication protocols, or an RF device.

The driving operation device 230 is a device that receives user input for driving the vehicle. In the manual mode, the vehicle 10 may be driven in response to a signal provided by the driving operation device 230. The driving operation device 230 may include a steering input device (e.g. a steering wheel), an acceleration input device (e.g. an accelerator pedal), and a brake input device (e.g. a brake pedal).

The main electronic control unit (ECU) 240 may control the overall operation of at least one electronic device provided in the vehicle 10.

The main ECU 240 may receive electronic horizon data. The main ECU 240 may include an electronic horizon re-constructor (EHR) 265. The EHR 265 may convert the electronic horizon data into a data format that can be used in the main ECU 240.

The vehicle-driving device 250 is a device that electrically controls the operation of various devices provided in the vehicle 10. The vehicle-driving device 250 may include a powertrain-driving unit, a chassis-driving unit, a door/window-driving unit, a safety-device-driving unit, a lamp-driving unit, and an air-conditioner-driving unit. The powertrain-driving unit may include a power-source-driving unit and a transmission-driving unit. The chassis-driving unit may include a steering-driving unit, a brake-driving unit, and a suspension-driving unit.

The driving system 260 may perform the driving operation of the vehicle 10. The driving system 260 may provide a control signal to at least one of the powertrain-driving unit or the chassis-driving unit of the vehicle-driving device 250 to drive the vehicle 10.

The driving system 260 may receive electronic horizon data. The driving system 260 may include an electronic horizon re-constructor (EHR) 265. The EHR 265 may convert the electronic horizon data into a data format that can be used in an ADAS application and an autonomous driving application.

The driving system 260 may include at least one of an ADAS application and an autonomous driving application. The driving system 260 may generate a driving control signal using at least one of the ADAS application or the autonomous driving application.

The sensing unit 270 may sense the state of the vehicle. The sensing unit 270 may include at least one of an inertial navigation unit (IMU) sensor, a collision sensor, a wheel sensor, a speed sensor, an inclination sensor, a weight detection sensor, a heading sensor, a position module, a vehicle forward/reverse movement sensor, a battery sensor, a fuel sensor, a tire sensor, a steering sensor for detecting rotation of the steering wheel, a vehicle internal temperature sensor, a vehicle internal humidity sensor, an ultrasonic sensor, an illuminance sensor, an accelerator pedal position sensor, or a brake pedal position sensor. The inertial navigation unit (IMU) sensor may include at least one of an acceleration sensor, a gyro sensor, or a magnetic sensor.

The sensing unit 270 may generate data on the state of the vehicle based on the signal generated by at least one sensor. The sensing unit 270 may obtain sensing signals of vehicle attitude information, vehicle motion information, vehicle yaw information, vehicle roll information, vehicle pitch information, vehicle collision information, vehicle heading information, vehicle angle information, vehicle speed information, vehicle acceleration information, vehicle inclination information, vehicle forward/reverse movement information, battery information, fuel information, tire information, vehicle lamp information, vehicle internal temperature information, vehicle internal humidity information, a steering wheel rotation angle, vehicle external illuminance, the pressure applied to the accelerator pedal, the pressure applied to the brake pedal, etc.

In addition, the sensing unit 270 may further include an accelerator pedal sensor, a pressure sensor, an engine speed sensor, an air flow sensor (AFS), an air temperature sensor (ATS), a water temperature sensor (WTS), a throttle position sensor (TPS), a TDC sensor, a crank angle sensor (CAS), etc.

The sensing unit 270 may generate vehicle state information on the basis of sensing data. The vehicle state information may be information generated on the basis of data sensed by various sensors provided in the vehicle.

For example, the vehicle state information may include vehicle posture information, vehicle speed information, vehicle inclination information, vehicle weight information, vehicle heading information, vehicle battery information, vehicle fuel information, vehicle tire air pressure information, vehicle steering information, vehicle internal temperature information, vehicle internal humidity information, pedal position information, vehicle engine temperature information, etc.

The location-data-generating device 280 may generate location data of the vehicle 10. The location-data-generating device 280 may include at least one of a global positioning system (GPS) or a differential global positioning system (DGPS). The location-data-generating device 280 may generate data on the location of the vehicle 10 based on a signal generated by at least one of the GPS or the DGPS. According to an embodiment, the location-data-generating device 280 may correct the location data based on at least one of the inertial measurement unit (IMU) of the sensing unit 270 or the camera of the object detection device 210.

The vehicle 10 may include an internal communication system 50. The plurality of electronic devices included in the vehicle 10 may exchange signals via the internal communication system 50. Data may be included in signals. The internal communication system 50 may use at least one communication protocol (e.g. CAN, LIN, FlexRay, MOST, and Ethernet).

Figure 5A:
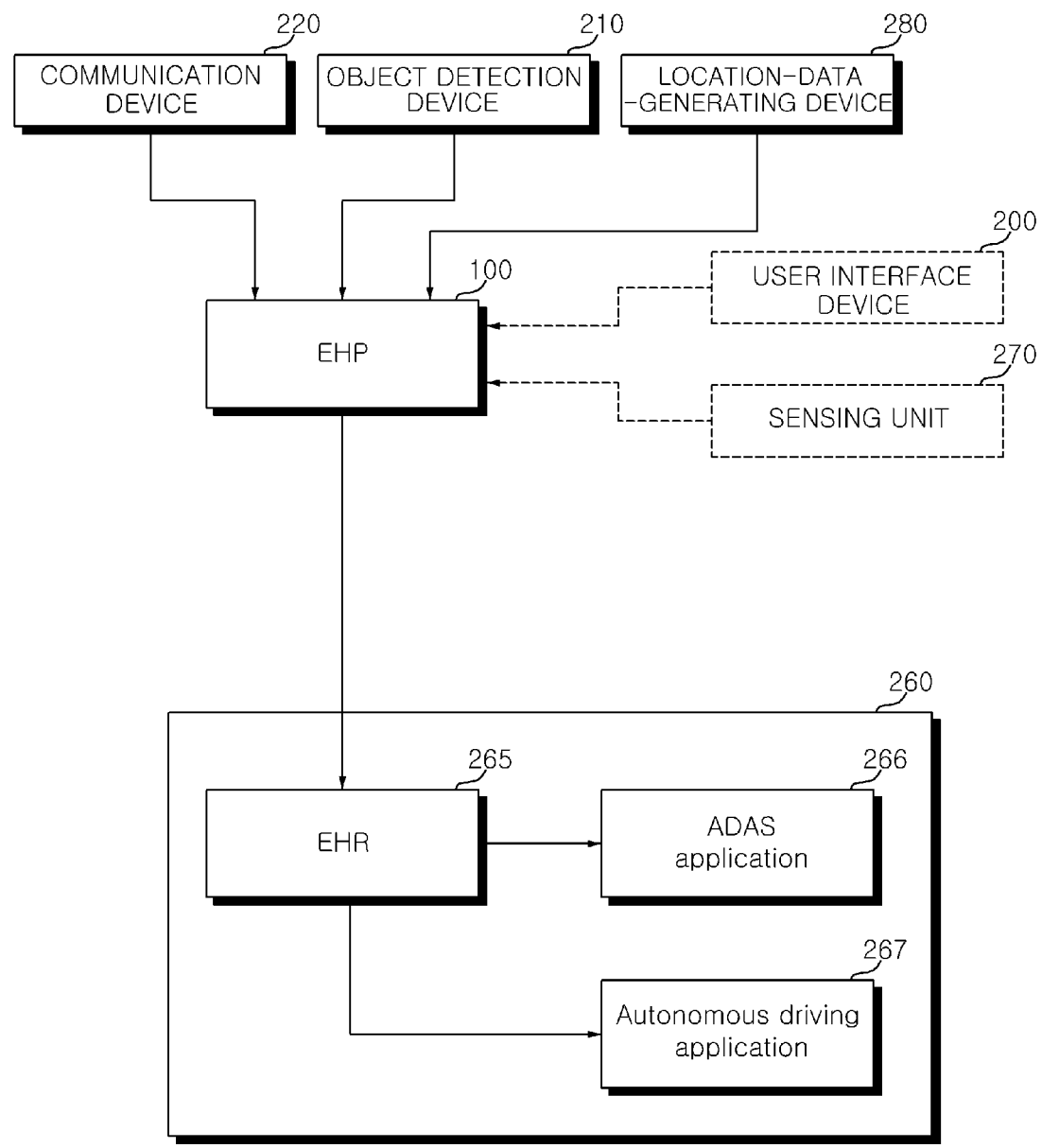
FIGS. 5A to 5C are signal flow diagrams of a vehicle including an electronic device according to an embodiment of the present disclosure.

FIG. 5A is a signal flow diagram of the vehicle including an electronic device according to an embodiment of the present disclosure.

Referring to FIG. 5A, the electronic device 100 may receive HD map data from the server 21 through the communication device 220.

The electronic device 100 may receive dynamic data from the object detection device 210. According to an embodiment, the electronic device 100 may receive dynamic data from the server 21 through the communication device 220.

The electronic device 100 may receive the location data of the vehicle from the location-data-generating device 280.

According to an embodiment, the electronic device 100 may receive a signal based on user input through the user interface device 200. According to an embodiment, the electronic device 100 may receive vehicle state information from the sensing unit 270.

The electronic device 100 may generate electronic horizon data based on HD map data, dynamic data, and location data. The electronic device 100 may match the HD map data, the dynamic data, and the location data to generate horizon map data. The electronic device 100 may generate horizon path data on the horizon map. The electronic device 100 may generate main path data and sub-path data on the horizon map.

The electronic device 100 may provide electronic horizon data to the driving system 260. The EHR 265 of the driving system 260 may convert the electronic horizon data into a data format that is suitable for the applications 266 and 267. The applications 266 and 267 may generate a driving control signal based on the electronic horizon data. The driving system 260 may provide the driving control signal to the vehicle-driving device 250.

The driving system 260 may include at least one of the ADAS application 266 or the autonomous driving application 267. The ADAS application 266 may generate a control signal for assisting the driver in driving the vehicle 10 through the driving operation device 230 based on the electronic horizon data. The autonomous driving application 267 may generate a control signal for enabling movement of the vehicle 10 based on the electronic horizon data.

Figure 5B:
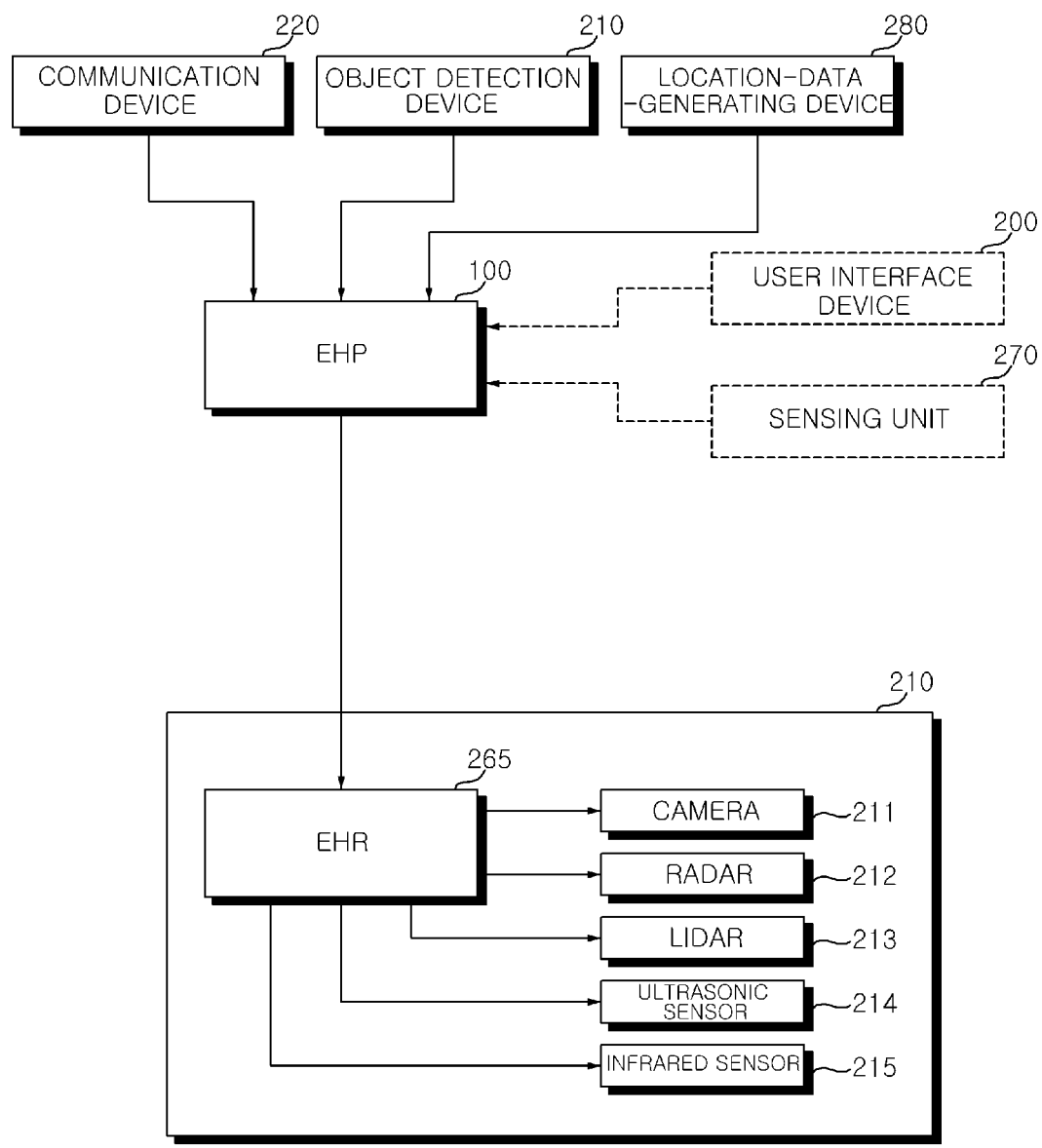

FIG. 5B is a signal flow diagram of the vehicle including an electronic device according to an embodiment of the present disclosure.

The difference from FIG. 5A will be mainly described with reference to FIG. 5B. The electronic device 100 may provide electronic horizon data to the object detection device 210. The EHR 265 of the object detection device 210 may convert the electronic horizon data into a data format that is suitable for the object detection device 210. The object detection device 210 may include at least one of a camera 211, a radar 212, a lidar 213, an ultrasonic sensor 214, or an infrared sensor 215. The electronic horizon data, the data format of which has been converted by the EHR 265, may be provided to at least one of the camera 211, the radar 212, the lidar 213, the ultrasonic sensor 214, or the infrared sensor 215. At least one of the camera 211, the radar 212, the lidar 213, the ultrasonic sensor 214, or the infrared sensor 215 may generate data based on the electronic horizon data.

Figure 5C:
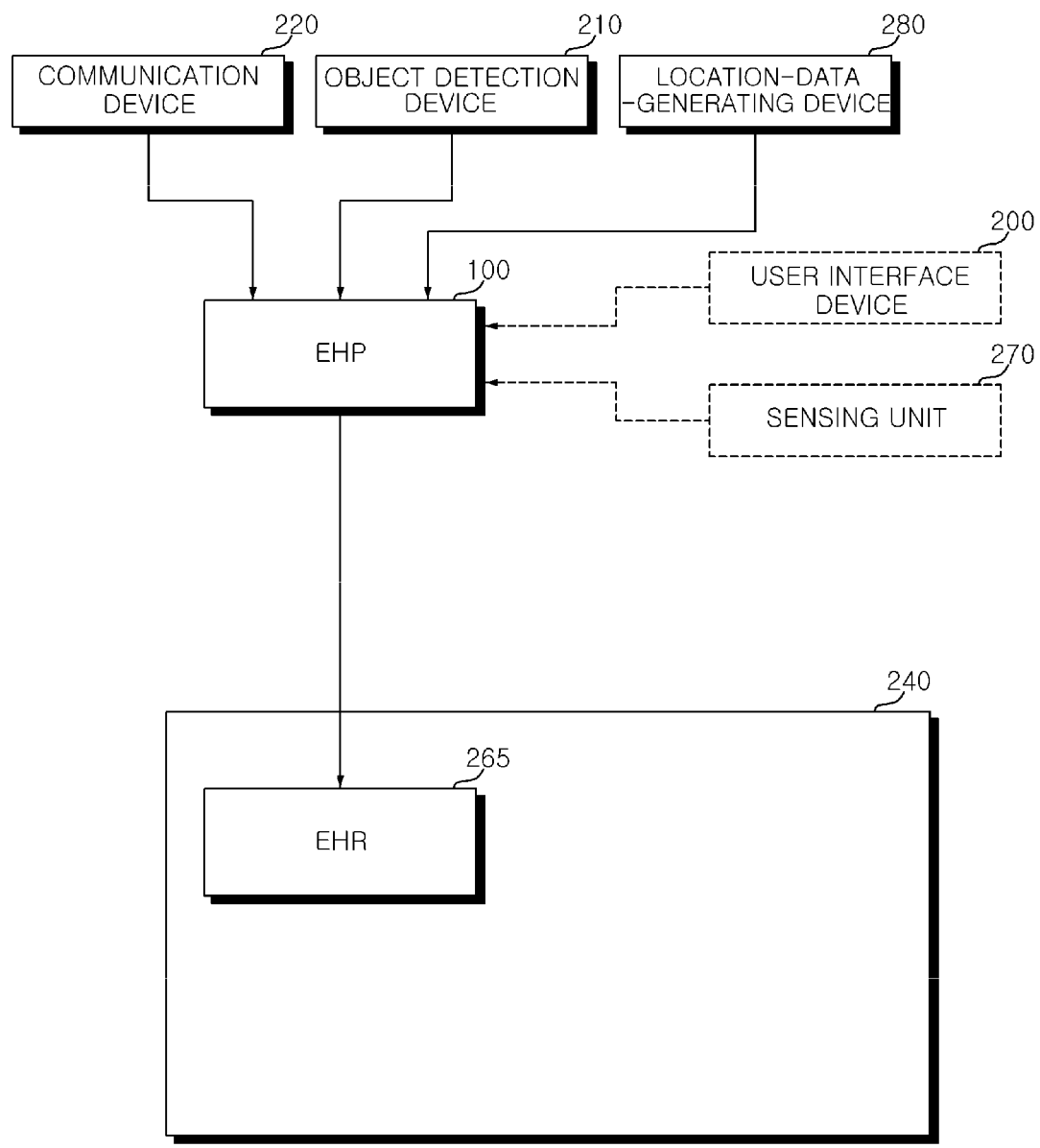

FIG. 5C is a signal flow diagram of the vehicle including an electronic device according to an embodiment of the present disclosure.

The difference from FIG. 5A will be mainly described with reference to FIG. 5C. The electronic device 100 may provide electronic horizon data to the main ECU 240. The EHR 265 of the main ECU 240 may convert the electronic horizon data into a data format that is suitable for the main ECU 240. The main ECU 240 may generate a control signal based on the electronic horizon data. For example, the main ECU 240 may generate a control signal for controlling at least one of the user interface device 180, the object detection device 210, the communication device 220, the driving operation device 230, the vehicle-driving device 250, the driving system 260, the sensing unit 270, or the location-data-generating device 280 based on the electronic horizon data.

Figure 6A:
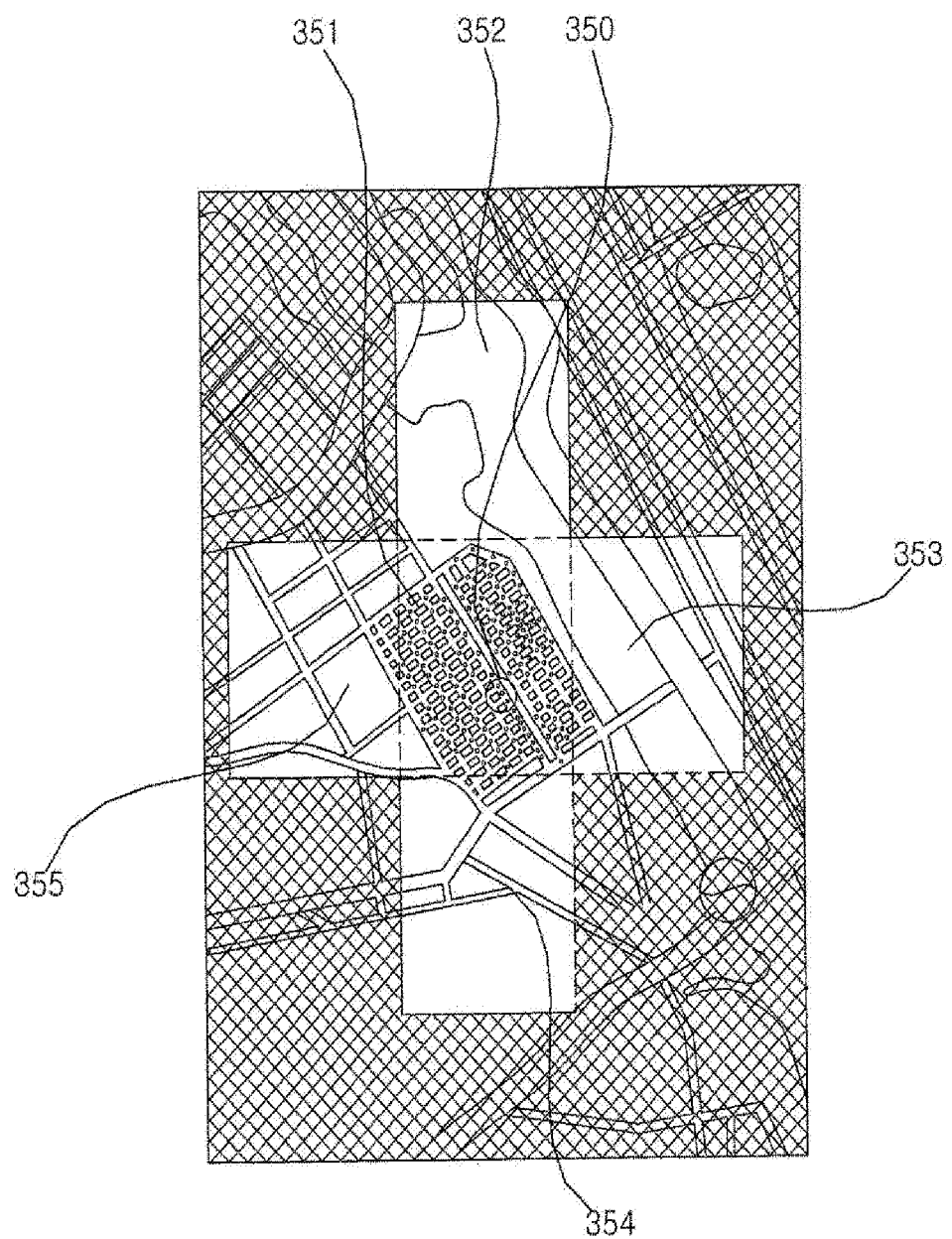
FIGS. 6A and 6B are diagrams illustrating the operation of receiving HD map data according to an embodiment of the present disclosure.
Figure 6B:
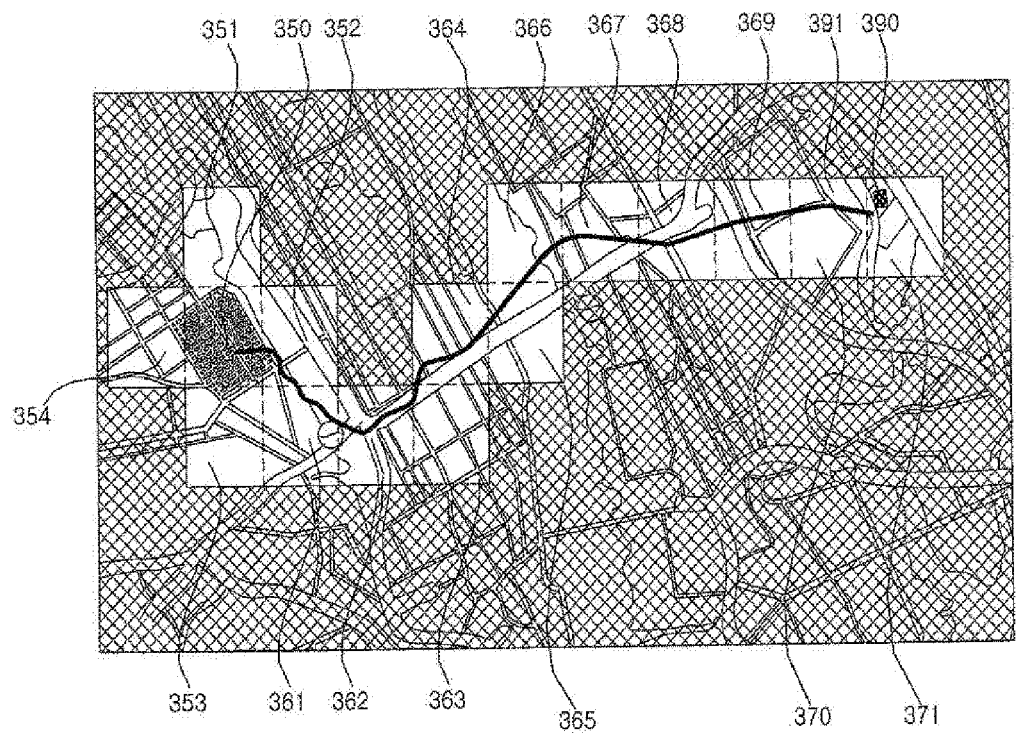

FIGS. 6A and 6B are diagrams illustrating the operation of receiving HD map data according to an embodiment of the present disclosure.

The server 21 may classify HD map data in units of HD map tiles, and may provide the same to the electronic device 100. The processor 170 may download HD map data from the server 21 in units of HD map tiles through the communication device 220.

The HD map tiles may be defined as sub-HD map data obtained by geographically sectioning the entire HD map in a rectangular shape. The entire HD map data may be obtained by connecting all of the HD map tiles. Since the HD map data is voluminous data, a high-performance controller is required for the vehicle 10 in order to download the entire HD map data to the vehicle 10 to use the same. With the development of communication technology, efficient data processing is possible by downloading, using, and deleting HD map data in the form of HD map tiles, rather than installing a high-performance controller in the vehicle 10.

The processor 170 may store the downloaded HD map tiles in the memory 140. The processor 170 may delete the stored HD map tiles. For example, when the vehicle 10 moves out of an area corresponding to an HD map tile, the processor 170 may delete the HD map tile. For example, when a predetermined time period elapses after an HD map tile is stored, the processor 170 may delete the HD map tile.

FIG. 6A is a diagram illustrating the operation of receiving HD map data when there is no preset destination.

Referring to FIG. 6A, when there is no preset destination, the processor 170 may receive a first HD map tile 351 including the location 350 of the vehicle 10. The server 21 may receive data on the location 350 of the vehicle 10 from the vehicle 10, and may provide the first HD map tile 351 including the location 250 of the vehicle 10 to the vehicle 10. In addition, the processor 170 may receive HD map tiles 352, 353, 354 and 355 surrounding the first HD map tile 351. For example, the processor 170 may receive HD map tiles 352, 353, 354 and 355, which are adjacent to and respectively located above, below, and to the left and right of the first HD map tile 351. In this case, the processor 170 may receive a total of five HD map tiles. For example, the processor 170 may further receive HD map tiles located in a diagonal direction, together with the HD map tiles 352, 353, 354 and 355, which are adjacent to and respectively located above, below, and to the left and right of the first HD map tile 351. In this case, the processor 170 may receive a total of nine HD map tiles.

FIG. 6B is a diagram illustrating the operation of receiving HD map data when there is a preset destination.

Referring to FIG. 6B, when there is a preset destination, the processor 170 may receive tiles 350, 352, 361, 362, 363, 364, 365, 366, 367, 368, 369, 370 and 371, which are associated with a route 391 from the location 350 of the vehicle 10 to the destination. The processor 170 may receive a plurality of tiles 350, 352, 361, 362, 363, 364, 365, 366, 367, 368, 369, 370 and 371 so as to cover the route 391.

The processor 170 may receive all of the tiles 350, 352, 361, 362, 363, 364, 365, 366, 367, 368, 369, 370 and 371, which cover the route 391, at the same time.

Alternatively, while the vehicle 10 is moving along the route 391, the processor 170 may sequentially receive the tiles 350, 352, 361, 362, 363, 364, 365, 366, 367, 368, 369, 370 and 371 at two or more times. While the vehicle 10 is moving along the route 391, the processor 170 may receive only some of the tiles 350, 352, 361, 362, 363, 364, 365, 366, 367, 368, 369, 370 and 371 on the basis of the location of the vehicle 10. Thereafter, the processor 170 may continuously receive the tiles during the movement of the vehicle 10, and may delete the previously received tiles.

Figure 6C:
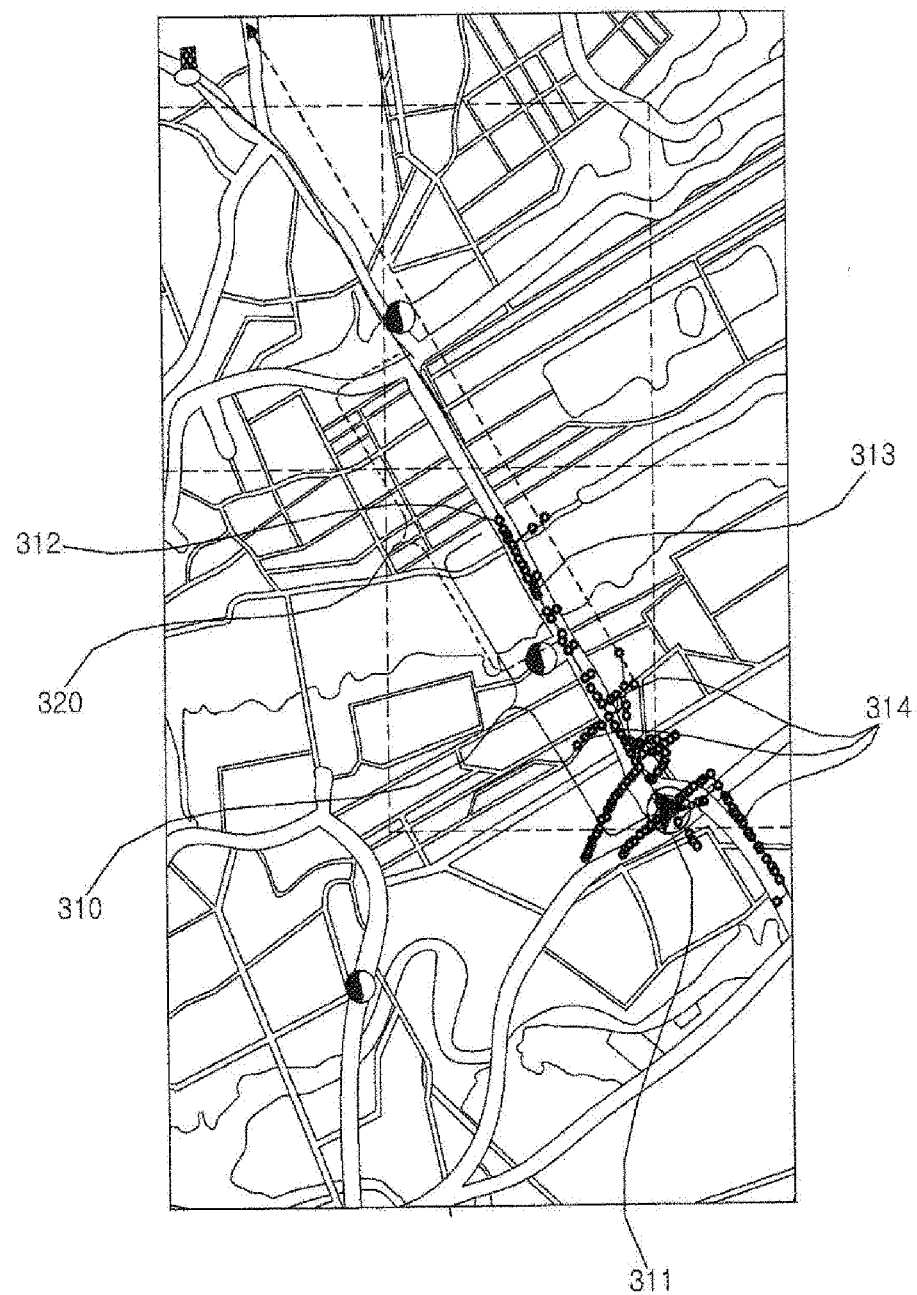
FIG. 6C is a diagram illustrating the operation of generating electronic horizon data according to an embodiment of the present disclosure.

FIG. 6C is a diagram illustrating the operation of generating electronic horizon data according to an embodiment of the present disclosure.

Referring to FIG. 6C, the processor 170 may generate electronic horizon data on the basis of HD map data.

The vehicle 10 may be driven in the state in which the final destination is set. The final destination may be set based on user input received through the user interface device 200 or the communication device 220. According to an embodiment, the final destination may be set by the driving system 260.

In the state in which the final destination is set, the vehicle 10 may be located within a predetermined distance from a first point while traveling. When the vehicle 10 is located within a predetermined distance from the first point, the processor 170 may generate electronic horizon data having the first point as a starting point and a second point as an ending point. The first point and the second point may be points on the route to the final destination. The first point may be explained as a point at which the vehicle 10 is located or is to be located in the near future. The second point may be explained as the horizon described above.

The processor 170 may receive an HD map of an area including the section from the first point to the second point. For example, the processor 170 may request and receive an HD map of an area within a predetermined radius from the section from the first point to the second point.

The processor 170 may generate electronic horizon data on the area including the section from the first point to the second point on the basis of the HD map. The processor 170 may generate horizon map data on the area including the section from the first point to the second point. The processor 170 may generate horizon path data on the area including the section from the first point to the second point. The processor 170 may generate data on a main path 313 in the area including the section from the first point to the second point. The processor 170 may generate a sub-path 314 in the area including the section from the first point to the second point.

When the vehicle 10 is located within a predetermined distance from the second point, the processor 170 may generate electronic horizon data having the second point as a starting point and a third point as an ending point. The second point and the third point may be points on the route to the final destination. The second point may be explained as a point at which the vehicle 10 is located or is to be located in the near future. The third point may be explained as the horizon described above. Meanwhile, the electronic horizon data having the second point as a starting point and the third point as an ending point may be geographically connected to the above-described electronic horizon data having the first point as a starting point and the second point as an ending point.

The operation of generating the electronic horizon data having the first point as a starting point and the second point as an ending point may be applied to the operation of generating the electronic horizon data having the second point as a starting point and the third point as an ending point.

According to an embodiment, the vehicle 10 may be driven even when a final destination is not set.

Figure 7:
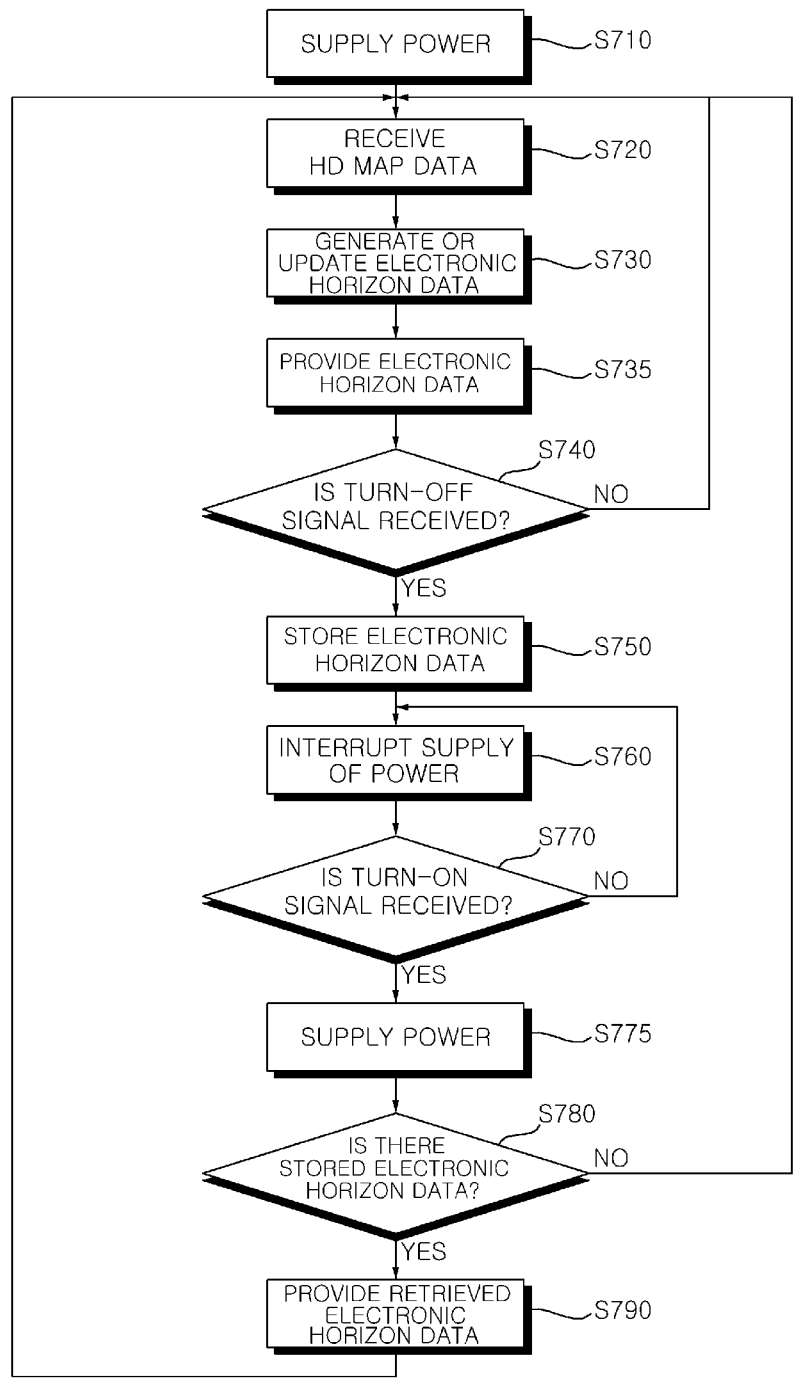
FIG. 7 is a flowchart of an electronic device according to an embodiment of the present disclosure.

FIG. 7 is a flowchart of an electronic device according to an embodiment of the present disclosure.

Referring to FIG. 7, the processor 170 may receive power through the power supply 190 (S710). The power supply 190 may supply power to the processor 170. When the vehicle 10 is turned on, the processor 170 may receive power supplied from the battery provided in the vehicle 10 through the power supply 190. The processor 170 may perform a processing operation when receiving power.

The processor 170 may receive HD map data through the interface 180 (S720). While the vehicle 10 is traveling, the interface 180 may receive HD map data on a specific geographic area from the server 21 through the communication device 220. The interface 180 may receive HD map data on an area around the location of the vehicle 10. When the vehicle 10 is to enter a first section, the interface 180 may receive HD map data on the first section. The interface 180 may transmit the received HD map data to the processor 170.

The processor 170 may continuously generate electronic horizon data on a specific area or update electronic horizon data already generated and stored in the memory 140 based on the HD map data in the state of receiving the power (S730).

When there is no electronic horizon data stored in the memory 140, the processor 170 may generate first electronic horizon data on a specific area based on the HD map data. When the first electronic horizon data has already been stored in the memory 140, the processor 170 may update the first electronic horizon data based on the HD map data.

The processor 170 may provide the electronic horizon data to the driving system 260 through the interface 180 (S735). The processor 170 may provide the first electronic horizon data generated or updated at step S730 to the driving system 260.

The processor 170 may determine whether a signal indicating that the vehicle 10 is turned off is received (S740). The interface 180 may receive a turn-off signal from at least one of the user interface device 200 or the main ECU 240. The interface 180 may transmit a turn-off signal to the processor 170.

Upon receiving a turn-off signal, the processor 170 may store the first electronic horizon data in the memory 140 (S750).

Thereafter, the supply of power to the processor 170 may be interrupted (S760). The power supply 190 may interrupt the supply of power to the processor 170 in response to the signal indicating that the vehicle 10 is turned off.

On the other hand, when the turn-off signal is not received at step S740, the process may return to step S720.

The processor 170 may determine whether a signal indicating that the vehicle 10 is turned on is received (S770). The interface 180 may receive a turn-on signal from at least one of the user interface device 200 or the main ECU 240. The interface 180 may transmit a turn-on signal to the processor 170.

The processor 170 may receive power through the power supply 190 (S775). The power supply 190 may supply power to the processor 170. When the vehicle 10 is turned on, the processor 170 may receive power supplied from a battery provided in the vehicle 10 through the power supply 190. The processor 170 may perform a processing operation when receiving power.

The processor 170 may determine whether there is first electronic horizon data stored in the memory 140 (S780).

Upon determining that there is first electronic horizon data stored in the memory 140, the processor 170 may retrieve the first electronic horizon data from the memory 140, and may provide the first electronic horizon data to the driving system 260 through the interface 180 (S790). Upon receiving a turn-on signal, the processor 170 may retrieve the first electronic horizon data stored in the memory 140, and may provide the first electronic horizon data to the driving system 260 prior to receiving the HD map data.

Step S790 may include, when the turn-on signal is received, a step of reflecting dynamic data acquired after turning on to the retrieved first electronic horizon data. Upon receiving the turn-on signal, the processor 170 may reflect dynamic data obtained after turning on to the first electronic horizon data retrieved from the memory 140, and may provide the first electronic horizon data. Through this operation, even when electronic horizon data generated before turning off is provided, various pieces of dynamic information may use the latest information.

After step S790, the process may return to step S720, and steps subsequent thereto may be performed.

As described in step S730, after receiving the turn-on signal, the processor 170 may receive the HD map data, and may update the first electronic horizon data.

Step S730 may include a step of obtaining at least one of information about the straight traveling situation of the vehicle or information about the stopped situation of the vehicle and a step of updating the first electronic horizon data in at least one of the straight traveling situation of the vehicle or the stopped situation of the vehicle.

The processor 170 may obtain at least one of information about the straight traveling situation of the vehicle or information about the stopped situation of the vehicle. For example, the processor 170 may receive at least one of information about the straight traveling situation of the vehicle or information about the stopped situation of the vehicle from at least one of the object detection device 210, the vehicle-driving device 250, or the sensing unit 270 through the interface 180. For example, the processor 170 may obtain at least one of information about the straight traveling situation of the vehicle or information about the stopped situation of the vehicle based on the HD map data. The processor 170 may update the first electronic horizon data in at least one of the straight traveling situation of the vehicle 10 or the stopped situation of the vehicle 10.

Figure 8A:
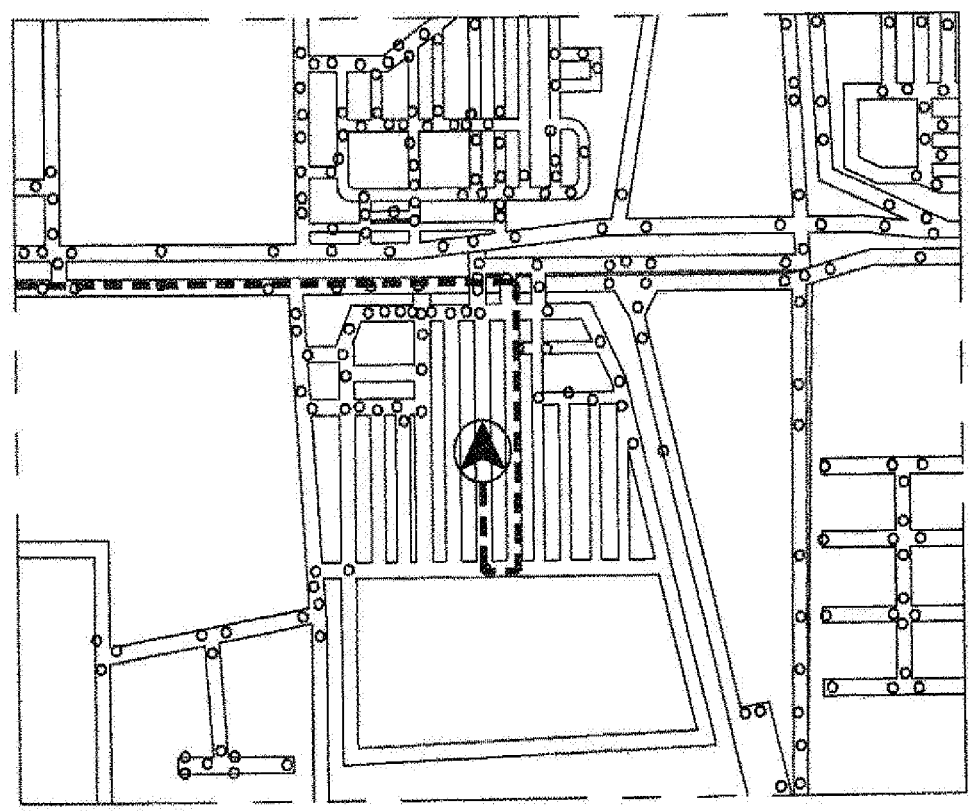
FIGS. 8A to 13B are diagrams illustrating the operation of an electronic device according to an embodiment of the present disclosure.
Figure 8B:
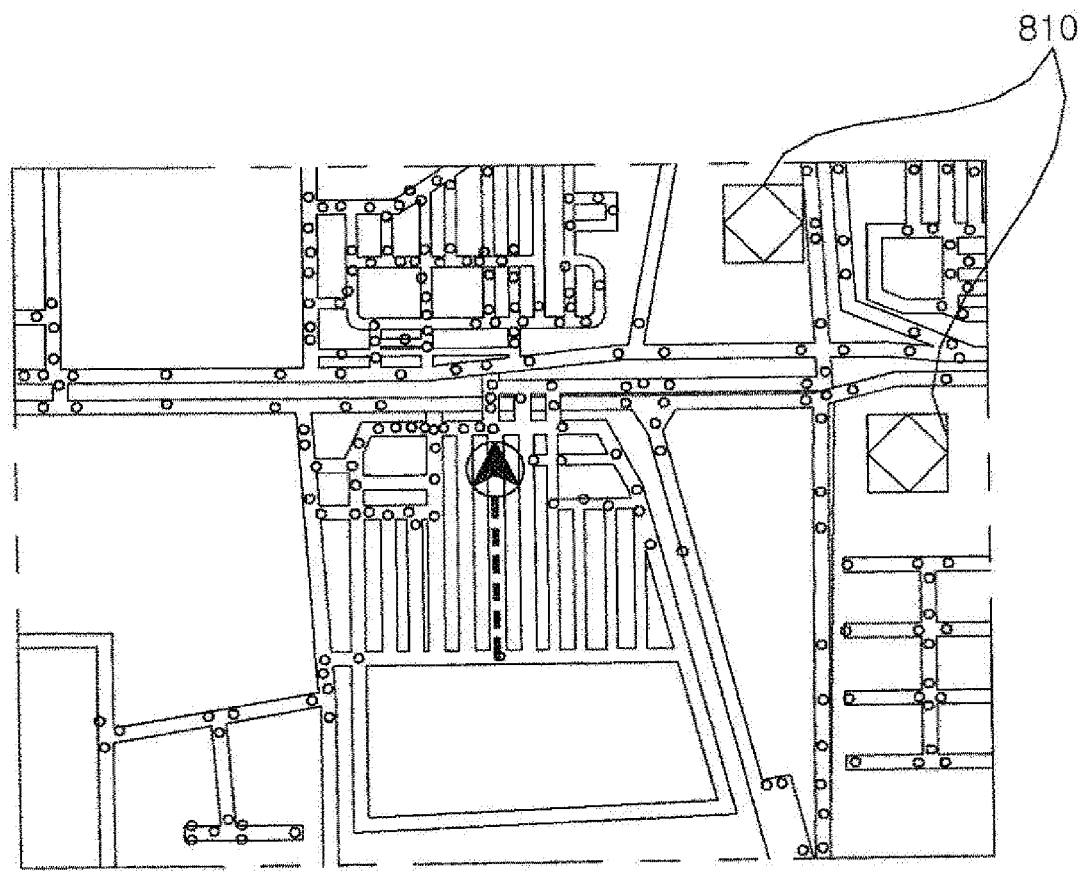

FIGS. 8A and 8B are diagrams illustrating the operation of retrieving first electronic horizon data from the memory and providing the first electronic horizon data according to an embodiment of the present disclosure.

As illustrated in FIG. 8A, the processor 170 may continuously generate electronic horizon data based on HD map data in the state of receiving power. Thereafter, the vehicle 10 may be turned off. The processor 170 may receive a turn-off signal. In this case, the processor 170 may store the first electronic horizon data that was generated last before turning off in the memory 140. The first electronic horizon data may include first horizon map data and first horizon path data. The first horizon path data may include a main path and a sub-path.

As illustrated in FIG. 8B, the vehicle 10 may be turned on. The processor 170 may receive a turn-on signal. The processor 170 may receive dynamic data after turning on. The processor 170 may reflect dynamic data 810 generated after turning on to the first electronic horizon data. The processor 170 may provide the first electronic horizon data, to which the dynamic data 810 has been reflected, to the driving system 260.

Meanwhile, after turning on, the processor 170 may receive HD map data in the state of receiving power. The processor 170 may update the first electronic horizon data based on the HD map data. The processor 170 may generate new electronic horizon data based on the HD map data.

Figure 9:
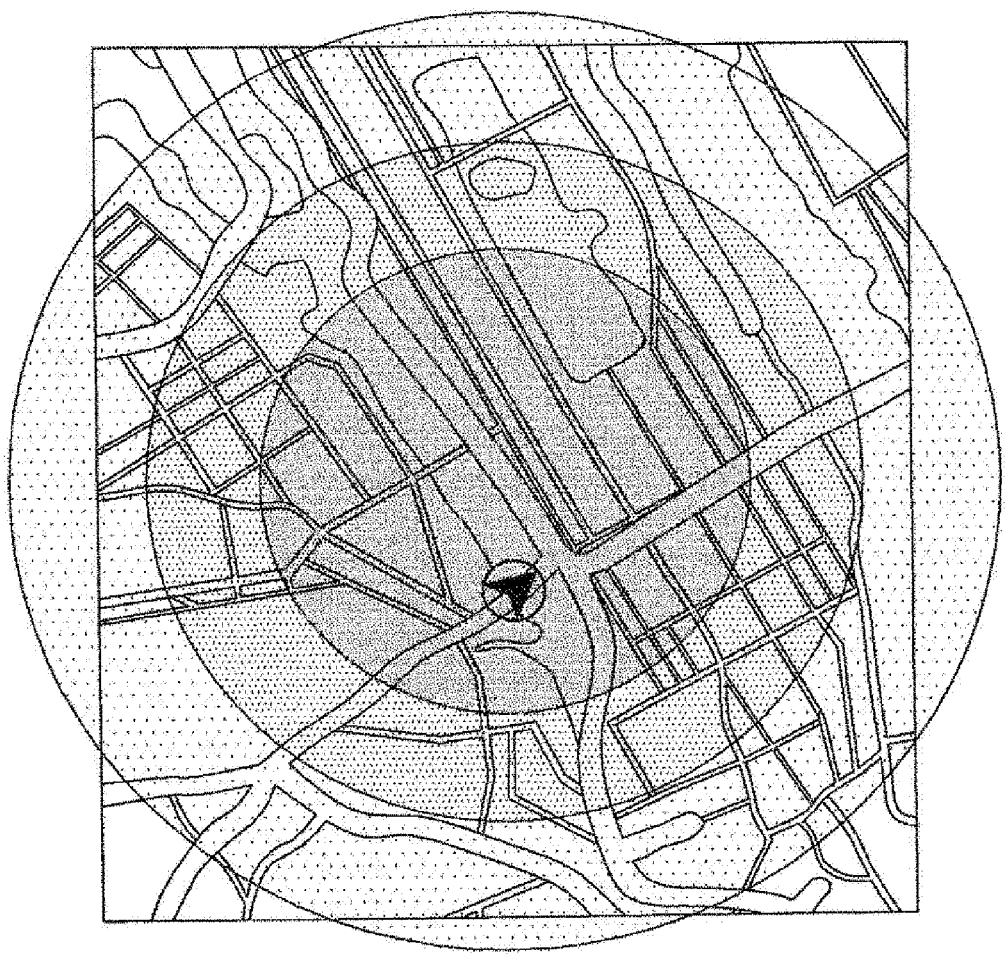

FIG. 9 is a diagram illustrating the geographical range of electronic horizon data according to an embodiment of the present disclosure.

As illustrated in FIG. 9, the processor 170 may receive data on driving condition information through the interface 180. The interface 180 may receive data on driving condition information of the vehicle 10. The driving condition information may include sensing range information of at least one sensor included in the object detection device (210 of FIG. 3). The driving condition information may include driving-speed information of the vehicle 10. The driving condition information may include traffic volume information. The interface 180 may transmit data on driving condition information to the processor 170.

The processor 170 may set the geographical range of the electronic horizon data based on data on the driving condition information. The electronic horizon data may include horizon map data and horizon path data. The horizon path data may include data on a main path, which is defined as a trajectory obtained by connecting roads having a high relative probability of being selected, and data on a sub-path, which branches from at least one decision point on the main path.

The processor 170 may set the geographical range of the electronic horizon data based on data on the sensing range information of at least one sensor included in the object detection device.

The processor 170 may set the geographical range of the electronic horizon data based on data on the driving-speed information of the vehicle.

The processor 170 may set the geographical range of the electronic horizon data based on data on the traffic volume information.

The processor 170 may generate electronic horizon data on a specific area based on HD map data. The processor 170 may generate electronic horizon data corresponding to the set geographical range based on the HD map data.

FIGS. 10A to 11B are diagrams illustrating a sleep mode of a vehicular electronic device according to an embodiment of the present disclosure.

Figure 10A:
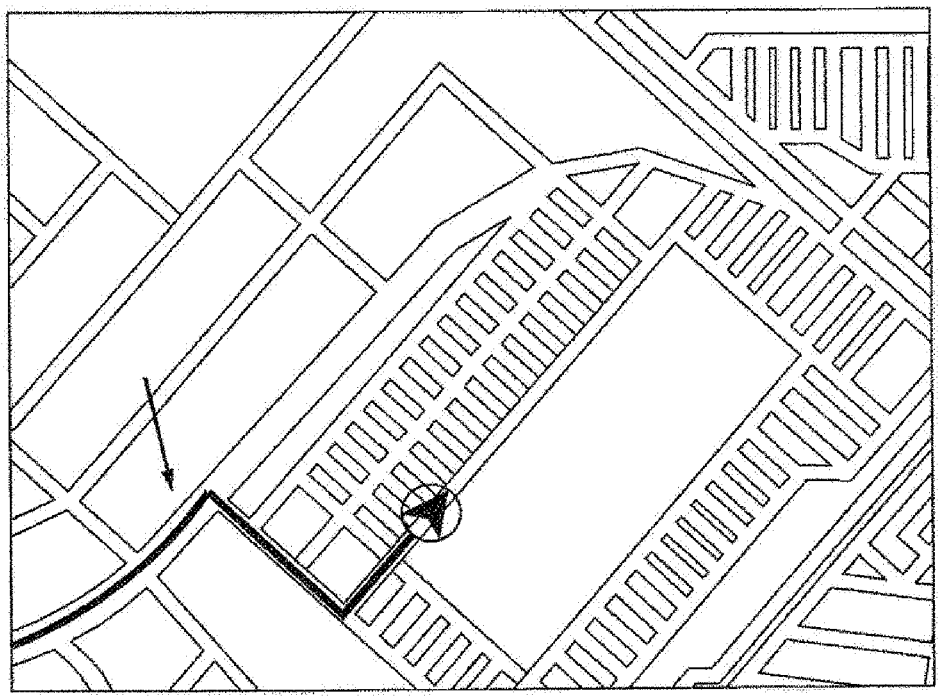
Figure 10B:
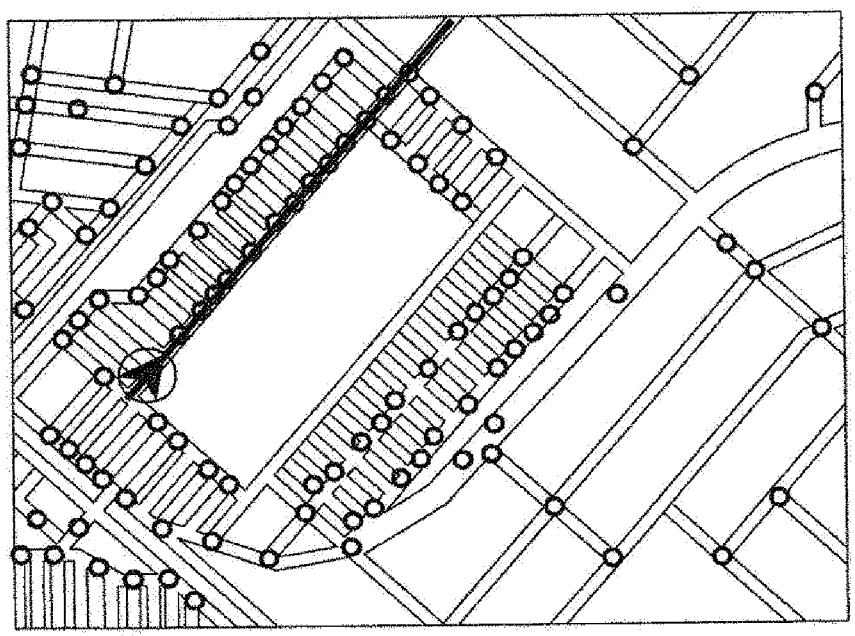

FIGS. 10A and 10B are diagrams illustrating the operation of the electronic device 100 in a first sleep mode.

The first sleep mode may be defined as the state in which a voltage is applied for a predetermined time period after the vehicle 10 is turned off. As illustrated in FIG. 10A, the processor 170 may store the first electronic horizon data in the memory 140 in the first sleep mode after turning off. As illustrated in FIG. 10B, after turning on, the processor 170 may retrieve the first electronic horizon data stored in the memory 140, and may provide the same to the driving system 260.

Figure 11A:
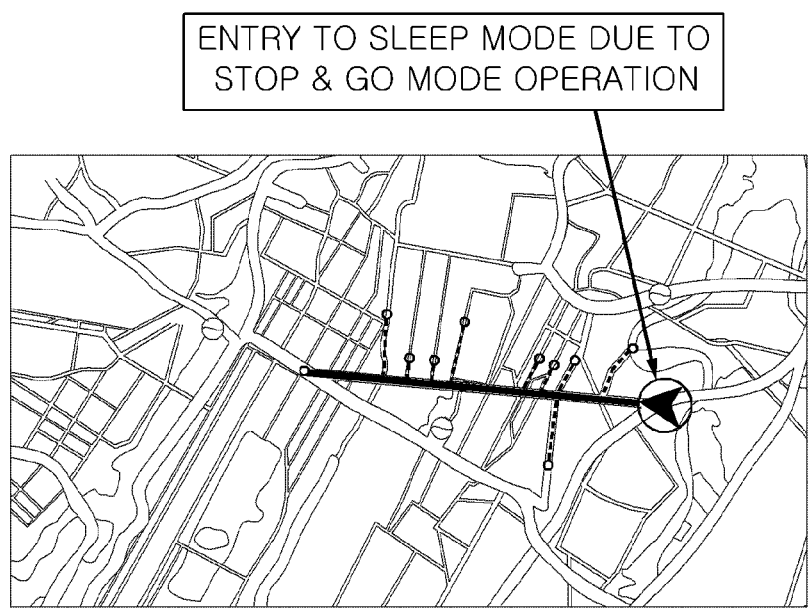
Figure 11B:
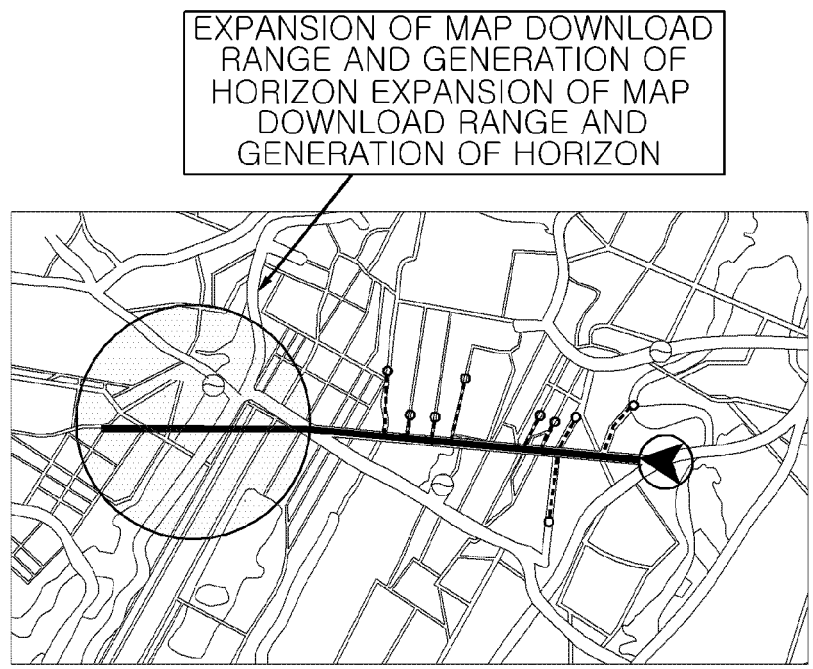

FIGS. 11A and 11B are diagrams illustrating the operation of the electronic device 100 in a second sleep mode.

The second sleep mode may be defined as the turn-off state when an idle stop & go (ISG) function is implemented. As illustrated in FIGS. 11A and 11B, in the second sleep mode, even when a path corresponding to the set horizon length is completely generated, the processor 170 may expand an HD map data download range in consideration of the traveling direction, and may generate a path corresponding thereto in advance.

Figure 12:
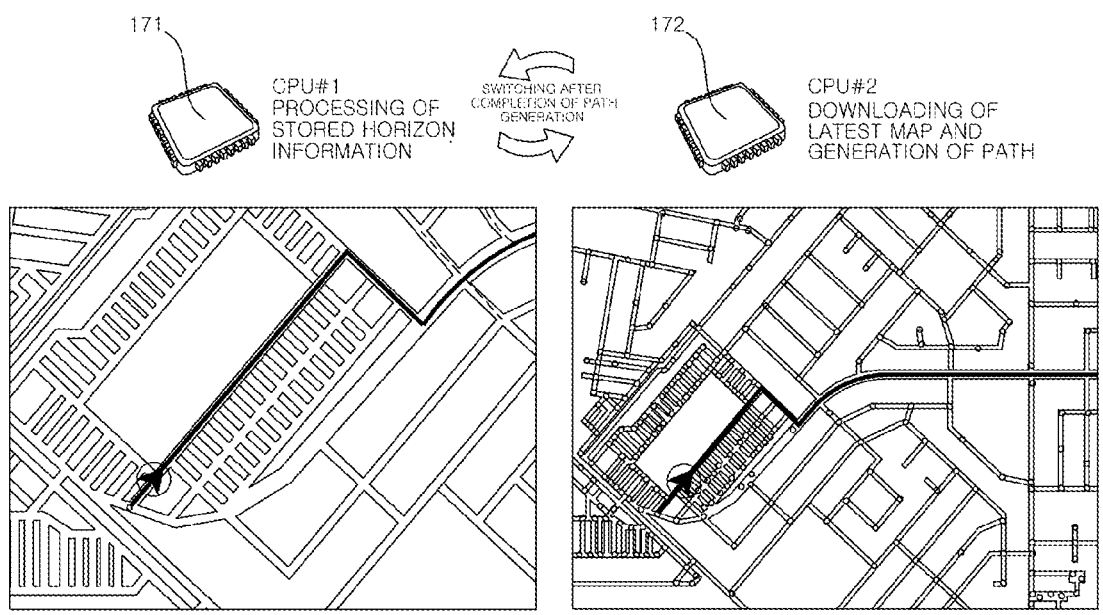

FIG. 12 is a diagram illustrating a plurality of processors according to an embodiment of the present disclosure.

Referring to FIG. 12, the processor 170 may include a first processor 171 and a second processor 172.

The first processor 171 may process the first electronic horizon data. The first processor 171 may store the first electronic horizon data in the memory 140. The first processor 171 may retrieve the first electronic horizon data. The first processor 171 may reflect dynamic data to the first electronic horizon data. The processor 171 may update the first electronic horizon data. The processor 171 may provide the first electronic horizon data.

After receiving the turn-on signal, the second processor 171 may receive HD map data, and may generate second electronic horizon data. After turning on, in the case in which the second electronic horizon data is completely generated, the second processor 171 may provide the second electronic horizon data instead of the first electronic horizon data.

Figure 13A:
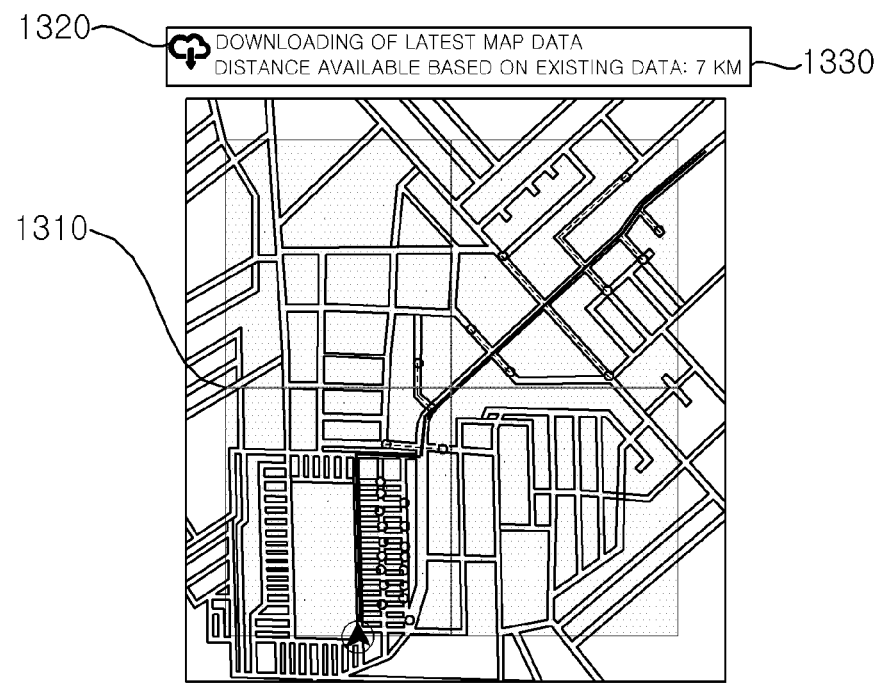
Figure 13B:
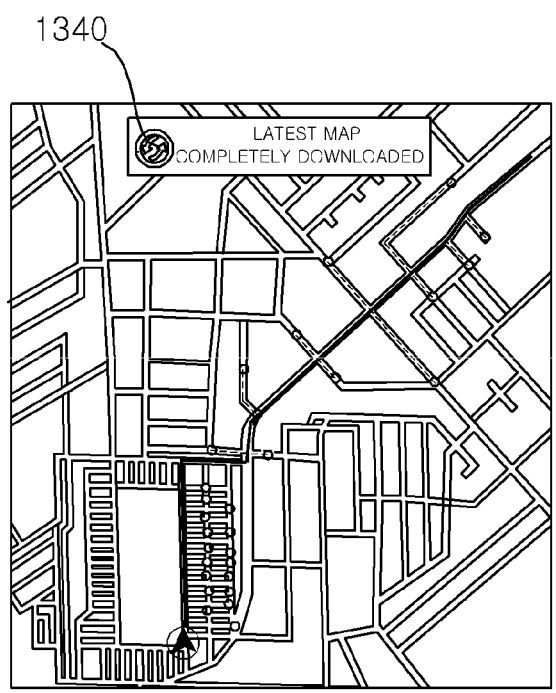

FIGS. 13A and 13B are diagrams illustrating an information-providing operation according to an embodiment of the present disclosure.

As illustrated in FIG. 13A, the processor 170 may provide information about the operation of the electronic device 100 to the user interface device 200. The user interface device 200 may output the information about the operation of the electronic device 100.

The processor 170 may provide data on the geographical range of the first electronic horizon data stored in the memory 140 to the user interface device 200. The user interface device 200 may output the geographical range 1310 of the first electronic horizon data stored in the memory 140 to the display such that the geographical range 1310 is distinguished from other areas. The user interface device 200 may output a message 1320 indicating that the latest HD map data is being downloaded. The user interface device 200 may output information 1330 about the distance that the vehicle is capable of traveling based on the first electronic horizon data.

As illustrated in FIG. 13B, the user interface device 200 may output information 1340 indicating that the first electronic horizon data has been completely updated based on the latest HD map data.

The above-described present disclosure may be implemented as computer-readable code stored on a computer-readable recording medium. The computer-readable recording medium may be any type of recording device in which data is stored in a computer-readable manner. Examples of the computer-readable recording medium include a Hard Disk Drive (HDD), a Solid-State Disk (SSD), a Silicon Disk Drive (SDD), ROM, RAM, a CD-ROM, a magnetic tape, a floppy disk, an optical data storage device, a carrier wave (e.g. transmission via the Internet), etc. In addition, the computer may include a processor or a controller. The above embodiments are therefore to be construed in all aspects as illustrative and not restrictive. The scope of the disclosure should be determined by reasonable interpretation of the appended claims, and all equivalent modifications made without departing from the disclosure should be considered to be included in the following claims.

DESCRIPTION OF REFERENCE NUMERALS

1: system
10: vehicle

100: electronic device
170: processor

The invention claimed is:

1. A vehicular electronic device comprising:
a power supply comprising circuitry and configured to supply power to the vehicular electronic device;
a memory;
an interface comprising circuitry and configured to receive (i) high-definition (HD) map data on a specific area from a server through a communication device and (ii) a turn-off signal and a turn-on signal; and
at least one processor configured to:
based on the turn-off signal being received, store, in the memory, first electronic horizon data related to a vicinity of a vehicle, the first electronic horizon data being generated based on HD map data,
based on the turn-on signal being received, receive the HD map data,
obtain at least one of information regarding a straight traveling situation of the vehicle or information regarding a stopped situation of the vehicle, and
update the first electronic horizon data in the at least one of the straight traveling situation of the vehicle or the stopped situation of the vehicle.

2. The vehicular electronic device of claim 1, wherein the at least one processor is configured to, based on the turn-on signal being received, retrieve the first electronic horizon data stored in the memory and provide the first electronic horizon data before the HD map data is received.

3. The vehicular electronic device of claim 2, wherein the at least one processor is configured to, based on the turn-on signal being received, reflect dynamic data obtained after turning on to the retrieved first electronic horizon data and provide the first electronic horizon data.

4. The vehicular electronic device of claim 1, wherein the at least one processor comprises:
a first processor configured to process the first electronic horizon data, and
a second processor configured to receive the HD map data and to, based on the turn-on signal being received, generate second electronic horizon data.

5. An operation method of a vehicular electronic device, the method comprising:
receiving, by at least one processor, power;
receiving, by the at least one processor, high-definition (HD) map data;
generating, by the at least one processor, first electronic horizon data related to a vicinity of a vehicle based on the HD map data;
storing, by the at least one processor, the first electronic horizon data in a memory based on a turn-off signal being received;
based on a turn-on signal being received, receiving, by the at least one processor, HD map data;
obtaining, by the at least one processor, at least one of information regarding a straight traveling situation of the vehicle or information regarding a stopped situation of the vehicle; and
updating, by the at least one processor, the first electronic horizon data in the at least one of the straight traveling situation of the vehicle or the stopped situation of the vehicle.

6. The method of claim 5, further comprising:
based on a turn-on signal being received, retrieving, by the at least one processor, the first electronic horizon data stored in the memory and providing the first electronic horizon data before the HD map data is received.

7. The method of claim 6, wherein providing the first electronic horizon data comprises:
based on the turn-on signal being received, reflecting, by the at least one processor, dynamic data obtained after turning on to the retrieved first electronic horizon data.

8. A system comprising:
a server configured to provide high-definition (HD) map data; and
at least one vehicle comprising an electronic device configured to receive the HD map data,
wherein the electronic device comprises:
a power supply comprising circuitry and configured to supply power to the electronic device;
a memory;
an interface comprising circuitry and configured to receive (i) HD map data on a specific area from the server through a communication device and (ii) a turn-off signal and a turn-on signal; and
at least one processor configured to:
based on the turn-off signal being received, store, in the memory, first electronic horizon data related to a vicinity of a vehicle, the first electronic horizon data being generated based on HD map data,
based on the turn-on signal being received, receive the HD map data,
obtain at least one of information regarding a straight traveling situation of the vehicle or information regarding a stopped situation of the vehicle, and
update the first electronic horizon data in the at least one of the straight traveling situation of the vehicle or the stopped situation of the vehicle.

9. The system of claim 8, wherein the at least one processor is configured to, based on the turn-on signal being received, retrieve the first electronic horizon data stored in the memory and provide the first electronic horizon data before HD map data is received through the communication device.

10. The system of claim 9, wherein the at least one processor is configured to, based on the turn-on signal being received, reflect dynamic data obtained after turning on to the retrieved first electronic horizon data and provide the first electronic horizon data.

11. The system of claim 8, wherein the at least one processor comprises:
a first processor configured to process the first electronic horizon data, and
a second processor configured to receive the HD map data and to, based on the turn-on signal being received, generate second electronic horizon data.

* * * * *